United States Patent
Lee et al.

(10) Patent No.: US 9,723,238 B2
(45) Date of Patent: Aug. 1, 2017

(54) IMAGE PROCESSING DEVICE HAVING ATTENUATION CONTROL CIRCUIT, AND IMAGE PROCESSING SYSTEM INCLUDING THE SAME

(71) Applicant: SAMSUNG ELECTRONICS CO., LTD., Suwon-si (KR)

(72) Inventors: Jung Ho Lee, Gunpo-si (KR); Hae Sick Sul, Hwaseong-si (KR); Sin Hwan Lim, Hwaseong-si (KR); Kyung Min Kim, Seoul (KR); Ho Jin Park, Suwon-si (KR); Jae Cheol Yun, Seoul (KR); Michael Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 14/730,885

(22) Filed: Jun. 4, 2015

(65) Prior Publication Data
US 2016/0028981 A1    Jan. 28, 2016

(30) Foreign Application Priority Data
Jul. 25, 2014    (KR) .......................... 10-2014-0095003

(51) Int. Cl.
*H04N 5/335*    (2011.01)
*H04N 5/378*    (2011.01)
*H04N 5/369*    (2011.01)
*H04N 5/3745*    (2011.01)

(52) U.S. Cl.
CPC .......... *H04N 5/378* (2013.01); *H04N 5/3698* (2013.01); *H04N 5/3745* (2013.01)

(58) Field of Classification Search
CPC ....................................................... H04N 5/378
USPC ......................................................... 348/308
See application file for complete search history.

(56) References Cited

U.S. PATENT DOCUMENTS

| | | | |
|---|---|---|---|
| 7,518,645 B2 | 4/2009 | Farrier | |
| 7,893,727 B2 | 2/2011 | Ambo et al. | |
| 2011/0309235 A1 | 12/2011 | Yoshida | |
| 2012/0133807 A1 | 5/2012 | Wu et al. | |
| 2012/0133808 A1* | 5/2012 | Park | G01J 1/46 348/294 |

(Continued)

FOREIGN PATENT DOCUMENTS

| | | |
|---|---|---|
| JP | 2007-336477 A | 12/2007 |
| JP | 2008-306405 A | 12/2008 |

(Continued)

*Primary Examiner* — Joel Fosselman
(74) *Attorney, Agent, or Firm* — Sughrue Mion, PLLC

(57) ABSTRACT

An image processing device includes a switch signal generator, an amplifier, a ramp generator, and an attenuation control circuit. The switch signal generator generates switch control signals based on a level of an image signal that corresponds to a pixel signal output from a pixel. The amplifier includes a first input terminal and a second input terminal. The ramp generator generates a ramp signal. The attenuation control circuit adjusts an arrangement of capacitors according to the switch control signals to control whether to attenuate each of the pixel signal and the ramp signal, and transmits signals generated as a result of the adjusted arrangement to the first input terminal and the second input terminal.

20 Claims, 15 Drawing Sheets

(56) References Cited

U.S. PATENT DOCUMENTS

2014/0029068 A1    1/2014   Takahashi
2014/0034812 A1    2/2014   Ikuma et al.

FOREIGN PATENT DOCUMENTS

| JP | 2010-183405 A | 8/2010 |
| JP | 2012-244593 A | 12/2012 |

* cited by examiner

FIRST ARRANGEMENT

SECOND ARRANGEMENT

IMAGE PROCESSING DEVICE HAVING ATTENUATION CONTROL CIRCUIT, AND IMAGE PROCESSING SYSTEM INCLUDING THE SAME

CROSS-REFERENCE TO RELATED APPLICATIONS

This application claims priority under 35 U.S.C. §119(a) from Korean Patent Application No. 10-2014-0095003 filed on Jul. 25, 2014, the disclosure of which is hereby incorporated by reference in its entirety.

BACKGROUND

1. Field

Apparatuses, devices, and articles of manufacture consistent with the present disclosure relate to analog-to-digital conversion in image sensors and, in particular, to controlling whether to attenuate an input signal according to a size of an input signal when performing the analog-to-digital conversion.

2. Description of the Related Art

A complementary metal-oxide-semiconductor (CMOS) image sensor is a solid-state image pickup device manufactured using CMOS processes. A CMOS image sensor is manufactured at lower cost and has pixels that are smaller in size than a charge-coupled device (CCD) image sensor including a high-voltage analog circuit. With the increase of performance of a CMOS image sensor, it has been widely used in electronic appliances including a portable device such as a smart phone or a digital camera.

A pixel array included in a related art CMOS image sensor includes a photoelectric conversion element in each pixel. The photoelectric conversion element generates an electrical signal varying with the quantity of incident light and the CMOS image sensor processes the electrical signal to generate an image. During this process, the electrical signal is analog-to-digital converted. As a number of pixels increases as the resolution and speed of the image sensor increases, there is a disadvantage in that the performance degrades and power consumption increases for high-resolution, high-speed image sensors.

SUMMARY

It is an aspect to provide an image processing device for performing analog-to-digital conversion on a wide-range input signal while reducing power consumption without performance deterioration, a method of operating the same, and an image processing system including the same.

According to an aspect of an exemplary embodiment, there is provided an image processing device including a switch signal generator, an amplifier, a ramp generator, and an attenuation control circuit. The switch signal generator generates switch control signals based on a level of an image signal that corresponds to a pixel signal output from a pixel. The amplifier includes a first input terminal and a second input terminal. The ramp generator generates a ramp signal. The attenuation control circuit adjusts an arrangement of capacitors according to the switch control signals to control whether to attenuate each of the pixel signal and the ramp signal, and transmits signals generated as a result of the adjusted arrangement to the first input terminal and the second input terminal.

According to another aspect of an exemplary embodiment, there is provided an image processing system including an image processing device and a processor. The processor is configured to control an operation of the image processing device. The image processing device includes a switch signal generator, an amplifier, a ramp generator, and an attenuation control circuit. The switch signal generator generates switch control signals based on a level of an image signal that corresponds to a pixel signal output from a pixel. The amplifier includes a first input terminal and a second input terminal. The ramp generator generates a ramp signal. The attenuation control circuit adjusts an arrangement of capacitors according to the switch control signals to control whether to attenuate each of the pixel signal and the ramp signal, and transmits signals generated as a result of the adjusted arrangement to the first input terminal and the second input terminal.

According to another aspect of an exemplary embodiment, there is provided an image processing device including a ramp generator, a switch signal generator, and an attenuation control circuit. The ramp generator is configured to generate a ramp signal. The switch signal generator is configured to generate a plurality of switch control signals based on a level of a pixel signal output from a pixel. The attenuation control circuit is configured to switch between a first circuit configuration in which the ramp signal and the pixel signal are not attenuated, and a second circuit configuration in which the ramp signal and the pixel signal are attenuated, according to the switch control signals, and to transmit signals generated as a result of the switched circuit configuration to a first input terminal and a second input terminal.

BRIEF DESCRIPTION OF THE DRAWINGS

The above and other aspects will become more apparent by describing in detail exemplary exemplary embodiments thereof with reference to the attached drawings in which.

DETAILED DESCRIPTION OF EXEMPLARY EMBODIMENTS

Figure 1:
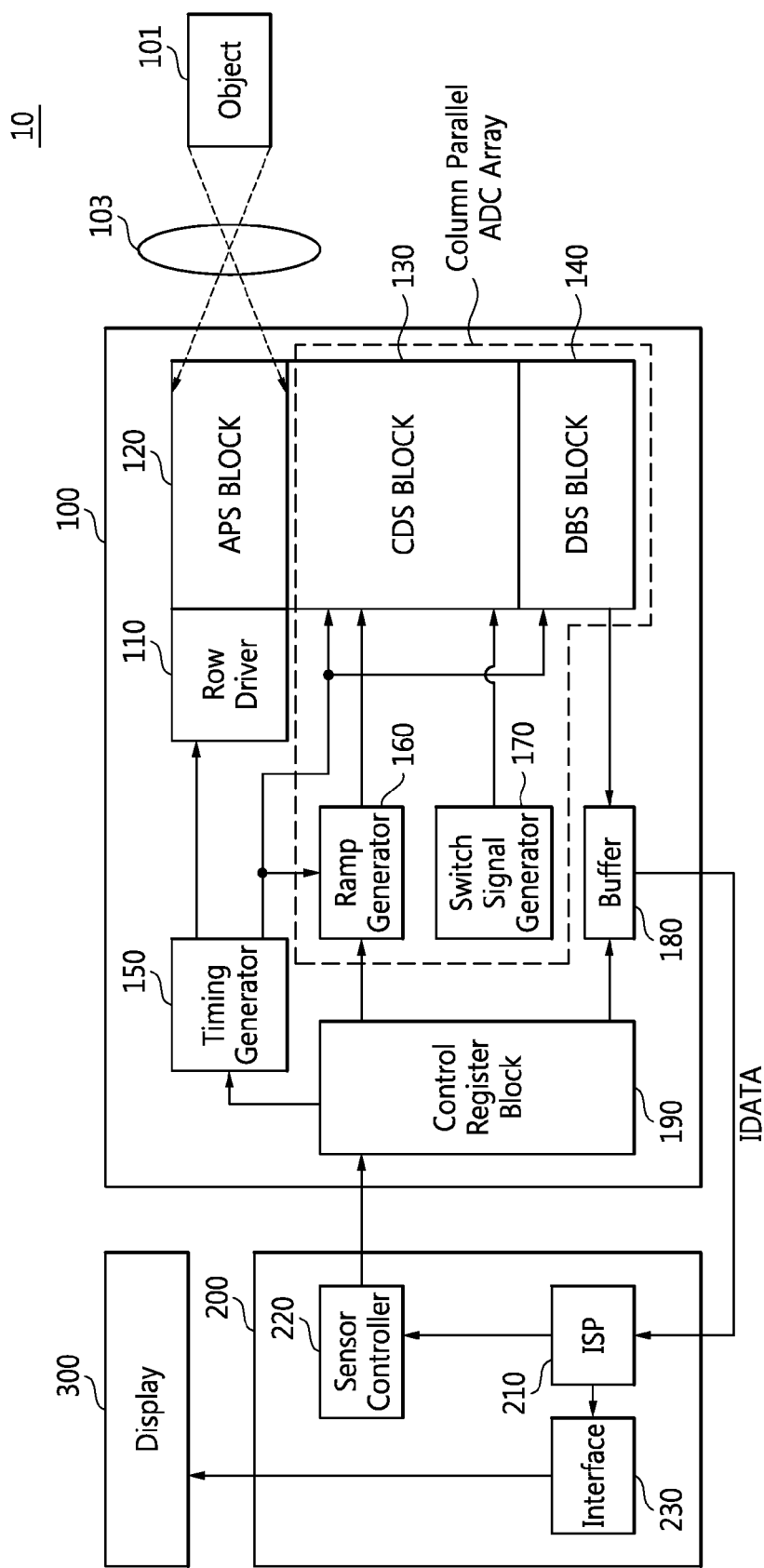
FIG. 1 is a block diagram of an image processing system according to some exemplary embodiments.

The inventive concept now will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, the element can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms "first", "second", etc. may be used herein to describe various elements, these elements should not be limited by these terms. These terms are only used to distinguish one element from another. For example, a "first" signal could be termed a "second" signal, and, similarly, a "second" signal could be termed a "first" signal without departing from the teachings of the disclosure.

The terminology used herein is for the purpose of describing particular exemplary embodiments only and is not intended to be limiting of the present inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system according to some exemplary embodiments. The image processing system 10 may be implemented as a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device, etc.

As shown in FIG. 1, an image processing system 10 includes an optical lens 103, an image processing device 100, a digital signal processor (DSP) 200, and a display 300. The image processing device 100 and the DSP 200 may be implemented in a chip together or in separate chips, respectively. The image processing device 100 may generate image data IDATA corresponding to an object input (or captured) through the optical lens 103.

The image processing device 100 includes a row driver 110, an active pixel sensor (APS) block 120, a correlated double sampling (CDS) block 130, a data bus (DBS) block 140, a timing generator 150, a ramp generator 160, a switch signal generator 170, a buffer 180, and a control register block 190. The elements 110 through 190 included in the image processing device 100 are illustrated in a plan view for the sake of convenience in the description. However, the physical placement and location of the elements 110 through 190 may be varied. Examples of the physical placement of each of the elements 110 through 190 will be described in detail with reference to FIGS. 2 through 9 later. The image processing device 100 may be implemented in a semiconductor package including one or more chips.

The row driver 110 may transmit a plurality of control signals for controlling the operation of pixels to the APS block 120 according to the control of the timing generator 150. The row driver 130 may control the operation of the pixels row by row.

The APS block 120 may include a plurality of pixels. The APS block 120 may be referred to as a pixel array. Each of the pixels may accumulate charges generated from incident light and may generate a pixel signal corresponding to the accumulated charges. The pixels may be arranged in a matrix. Each of the pixels may include a photoelectric conversion element and a plurality of transistors that process charges output from the photoelectric conversion element. Each pixel may output its pixel signal to a column line. The photoelectric conversion element may be a photodiode, a photo transistor, a photogate, or a pinned photodiode.

The CDS block 130 performs CDS on a pixel signal output from each of column lines formed in the APS block 120 to generate a CDS pixel signal.

The DBS block 140 converts each of CDS pixel signals output from the CDS block 130 into a digital signal and outputs digital signals generated as the result of the conversion to the buffer 180. The CDS block 130, the DBS block 140, the ramp generator 160, and the switch signal generator 170 together form a single-slope analog-to-digital converter (ADC) to function as a Column Parallel ADC Array.

The timing generator 150 may control the operations of the row driver 110, the CDS block 130, the DBS block 140, and the ramp generator 160 according to the control of the control register block 190. The timing generator 150 may also control the operation of the switch signal generator 170.

The switch signal generator 170 may generate switch control signals based on the levels of image signals related with pixel signals output from the pixels (or image signals generated by processing the pixel signals). For example, the image signals may be digital signals corresponding to analog pixel signals generated during one or more frame periods in auto exposure mode. The digital signals may have been processed by the CDS block 130 and the DBS block 140.

The image signals may be used by the DSP 200 to determine analog gain. The DSP 200 may control the switch signal generator 170 to generate switch control signals according to the levels of the image signals.

The buffer 180 stores the image data IDATA corresponding to the digital signals output from the DBS block 140 and transmits the image data IDATA to the DSP 200.

The control register block 190 controls the operations of the timing generator 150, the ramp generator 160, and the buffer 180 according to the control of the DSP 200. The generation of switch control signals by the switch signal generator 170 may be controlled by the control register block 190 or the timing generator 150.

The DSP 200 includes an image signal processor (ISP) 210, a sensor controller 220, and an interface 230.

The ISP 210 may control the interface 230, and the sensor controller 220 which controls the control register block 190. The image processing device 100 and the DSP 200 may be respectively implemented in chips in a single package, e.g., a multi-chip package (MCP). Alternatively, the image processing device 100 and the ISP 210 may be respectively implemented in chips in a single package, e.g., a MCP. As another alternative, the image processing device 100 and the ISP 210 may be implemented together in a single chip. The ISP 210 may process the image data IDATA received from the buffer 180 to be suitable to human eyes and transmit the processed image data to the interface 230.

The sensor controller 220 may generate various control signals for controlling the control register block 190 according to the control of the ISP 210. The interface 230 may transmit the processed image data from the ISP 210 to the display 300.

The display 300 displays the image data output from the interface 230. The display 300 may be a thin film transistor-liquid crystal display (TFT-LCD), a light emitting diode (LED) display, an organic LED (OLED) display, an active-matrix OLED (AMOLED) display, or a flexible display, etc.

Figure 2:
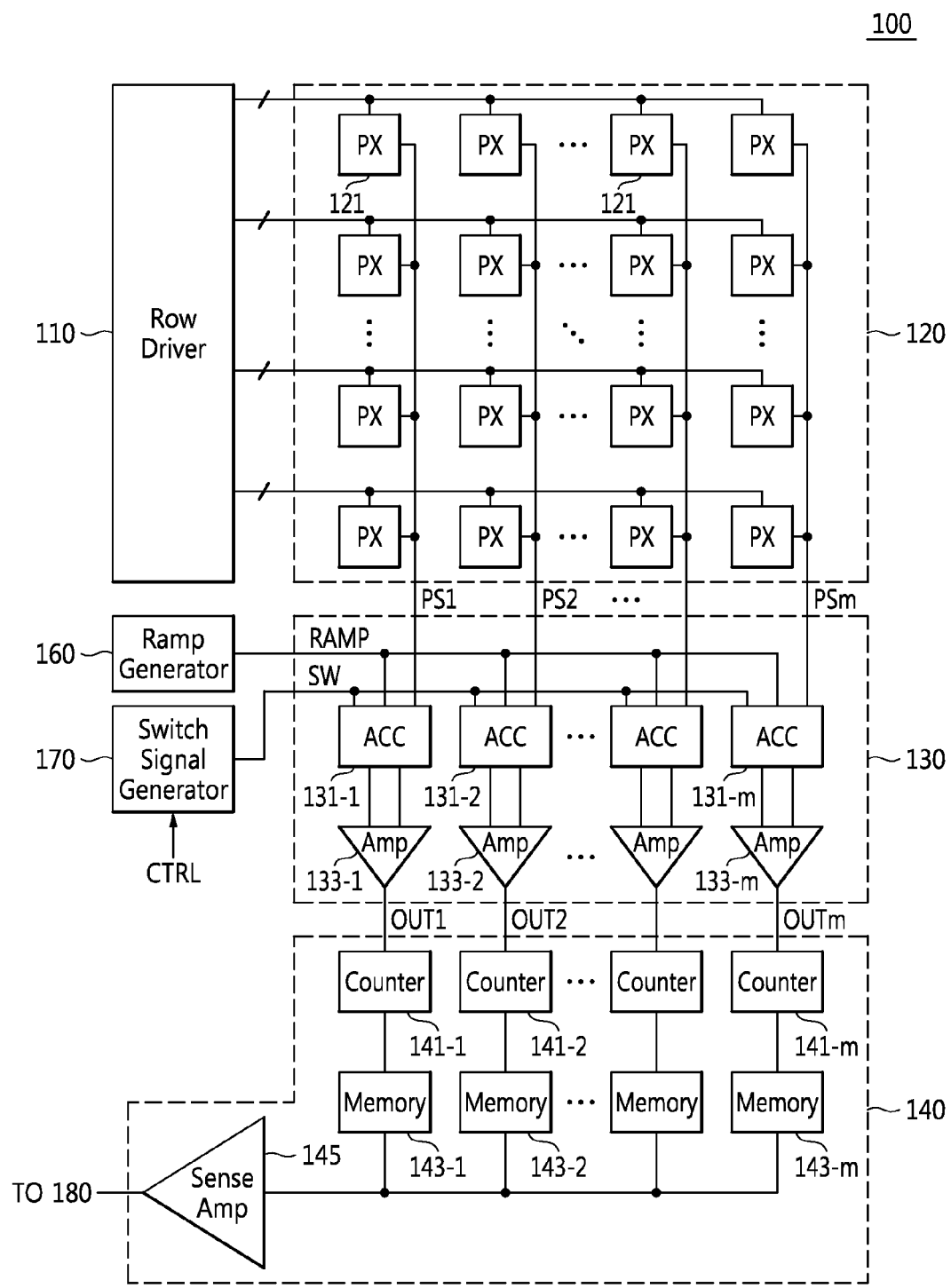
FIG. 2 is a detailed block diagram of an image processing device illustrated in FIG. 1.

FIG. 2 is a detailed block diagram of the image processing device illustrated in FIG. 1. Referring to FIGS. 1 and 2, the image processing device comprises the APS block 120 which includes a plurality of pixels 121 arranged in a matrix.

The row driver 110 may drive the pixels 121 in the APS block 120 in units of rows. The row driver 110 may generate control signals for controlling the operation of pixels 121 in each row. Pixel signals PS1 through PSm output from the pixels 121 to the columns, respectively, may be transmitted to the CDS block 130 according to the control signals, where "m" is a natural number greater than 2.

The CDS block 130 includes a plurality of attenuation control circuits (ACCs) 131-1 through 131-*m* and a plurality of amplifiers 133-1 through 133-*m*. The CDS block 130 includes "m" unit CDS circuits. Each unit CDS circuit includes one ACC 131-*i* and one amplifier 133-*i*, where 1≤i≤m. In other words, the ACCs and the amplifiers are provided in a one-to-one relationship.

The APS block 120 and the amplifiers 133-1 through 133-*m* may be formed together in one chip. Alternatively, the APS block 120 may be formed in one chip, and the amplifiers 133-1 through 133-*m* may be formed in another chip different form the chip on which the APS block 120 is formed. At this time, the image processing device 100 may be implemented in a single semiconductor package. A first voltage applied to the APS block 120 may be higher than a second voltage applied to the amplifiers 133-1 through 133-*m*.

Each of the ACCs 131-1 through 131-*m* may include a plurality of capacitors and a plurality of switches. The ACCs 131-1 through 131-*m* may receive the pixel signals PS1 through PSm, respectively and may receive a ramp signal RAMP from the ramp generator 160 and switch control signals SW from the switch signal generator 170.

Each of the ACCs 131-1 through 131-*m* may control or reconstruct the arrangement of capacitors using switches switched in response to the switch control signals SW and may control whether to attenuate the ramp signal RAMP and a corresponding one of the pixel signals PS1 through PSm using the reconstructed arrangement. That is, each ACC 131-1 through 131-*m* may change a configuration of capacitors using switches that are switched in response to the switch control signals. Each of the ACCs 131-1 through 131-*m* may transmit signals generated according to the result of the control to a first input terminal and a second input terminal of a corresponding one of the amplifiers 133-1 through 133-*m*.

The amplifiers 133-1 through 133-*m* may generate amplified signals OUT1 through OUTm, respectively, using signals output from the ACCs 131-1 through 131-*m* and may transmit the amplified signals OUT1 through OUTm to counters 141-1 through 141-*m*, respectively, which are included in the DBS block 140.

The DBS block 140 may include the counters 141-1 through 141-*m* and a corresponding plurality of memories 143-1 through 143-*m*. That is, the counters 141-1 through 141-*m* and the memories 143-1 through 143-*m* may be provided in a one-to-one relationship.

Each of the counters 141-1 through 141-*m* may count a level transition time of a corresponding one of the amplified signals OUT1 through OUTm respectively output from the amplifiers 133-1 through 133-*m* using a clock signal, and may output a digital signal corresponding to a count result. At this time, the level transition time may be determined according to the level of the ramp signal RAMP and the level of each of the pixel signals PS1 through PSm.

A clock signal generator (not shown) generates the clock. The clock signal generator may be provided separately, may be formed within one of the counters 141-1 through 141-*m*, may be provided within the timing generator 150, or may be provided elsewhere within the image processing device 100. In other words, the position of the clock signal generator may vary.

Each of the memories 143-1 through 143-*m* may store a digital signal output from a corresponding one of the counters 141-1 through 141-*m*. Each of the memories 143-1 through 143-*m* may be implemented as static random access memory (SRAM). The digital signal stored in each of the memories 143-1 through 143-*m* may be amplified by the sense amplifier 145 and then transmitted to the buffer 180.

Figure 3A:
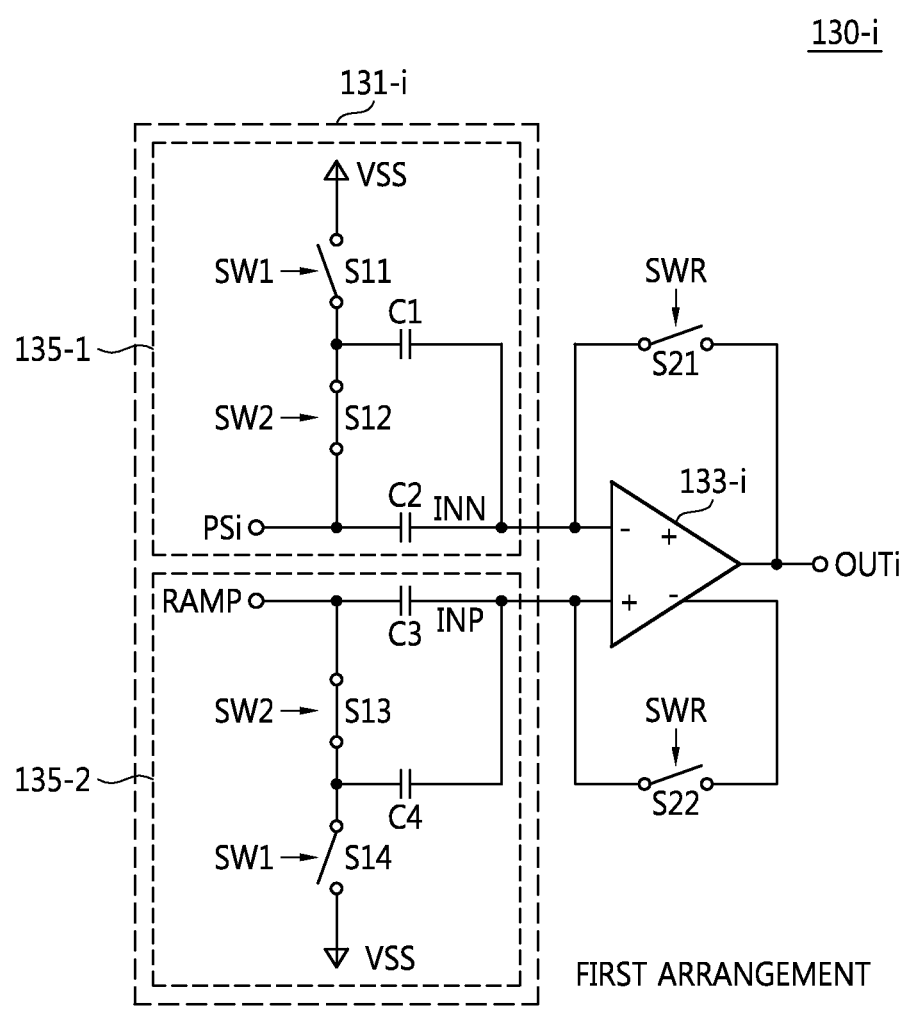
FIG. 3A is a circuit diagram of a unit correlated double sampling (CDS) circuit having a first arrangement.
Figure 3B:
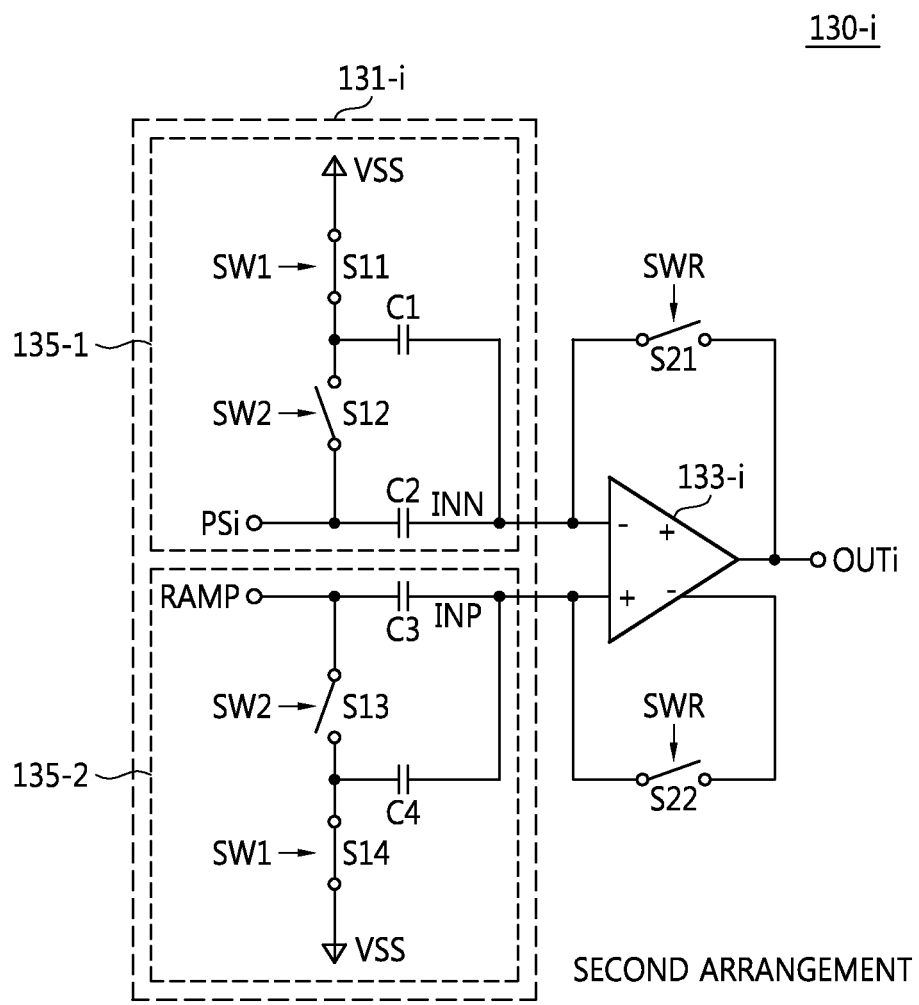
FIG. 3B is a circuit diagram of a unit CDS circuit having a second arrangement.

FIG. 3A is a circuit diagram of a unit CDS circuit having a first arrangement. FIG. 3B is a circuit diagram of a unit CDS circuit having a second arrangement. In the first arrangement shown in FIG. 3A, the unit CDS circuit does not attenuate the signals, whereas in the second arrangement shown in FIG. 3B, the unit CDS circuit attenuates the signals. The ACCs 131-1 through 131-*m* illustrated in FIG. 2 have substantially the same or similar structures and operations. The amplifiers 133-1 through 133-*m* illustrated in FIG. 2 have substantially the same or similar structures and operations. The unit CDS circuit 130-*i* includes a plurality of reset switches S21 and S22 operating in response to a reset switch signal SWR.

FIGS. 3A and 3B show the arrangements for explaining the operation of the i-th ACC 131-*i* and the i-th amplifier 133-$i$. The i-th ACC 131-$i$ receives the ramp signal RAMP and a pixel signal PSi output from an i-th column line among "m" column lines included in the APS block 120.

The i-th ACC 131-$i$ includes a plurality of capacitors C1 through C4 and a plurality of switches S11 through S14. The capacitors C1 through C4 have substantially the same capacitance. Here, "substantially the same" denotes being the same physically or within a margin of error.

Each of the switches S11 through S14, S21, and S22 may be implemented as a N-channel metal-oxide semiconductor (NMOS) transistor or a P-channel MOS (PMOS) transistor, or a combination of NMOS transistors and/or PMOS transistors. For the sake of convenience in the description, it is assumed that each of the switches S11 through S14, S21, and S22 is implemented as an NMOS transistor in the exemplary embodiments illustrated in FIGS. 3A and 3B.

Referring to FIG. 3A, when the unit CDS circuit 130-$i$ does not attenuate the i-th pixel signal PSi and the ramp signal RAMP, the i-th ACC 131-$i$ controls the operation (e.g., on or off) of the switches S11 through S14 in response to the switch control signals SW. Accordingly, the first arrangement indicates the arrangement of the switches S11 through S14 and the capacitors C1 through C4 illustrated in FIG. 3A in which the i-th pixel signal PSi and the ramp signal RAMP are not attenuated.

Referring to FIG. 3B, when the unit CDS circuit 130-$i$ attenuates the i-th pixel signal PSi and the ramp signal RAMP, the i-th ACC 131-$i$ controls the operation (e.g., on or off) of the switches S11 through S14 in response to the switch control signals SW. Accordingly, the second arrangement indicates the arrangement of the switches S11 through S14 and the capacitors C1 through C4 illustrated in FIG. 3B in which the i-th pixel signal PSi and the ramp signal RAMP are attenuated.

Here, the switch control signals SW include a first switch signal SW1, a second switch signal SW2, and the reset switch signal SWR.

The unit CDS circuit 130-$i$ may attenuate the pixel signal PSi and the ramp signal RAMP when the unit CDS circuit 130-$i$ is in the first arrangement shown in FIG. 3A, and does not attenuate the pixel signal PSi and the ramp signal RAMP when the unit CDS circuit 130-$i$ is in the second arrangement shown in FIG. 3B. For instance, when input signals have low levels, a signal-to-noise ratio (SNR) is relatively low, and therefore, noise is dominant. At this time, if the input signals are attenuated by the i-th ACC 131-$i$, performance will deteriorate. In this case, the i-th ACC 131-$i$ does not attenuate the input signals, i.e., the pixel signal PSi and the ramp signal RAMP, in response to the switch control signals SW1 and SW2, as shown in FIG. 3A.

However, when input signals have high levels, a signal-to-noise ratio (SNR) is relatively high, and therefore, noise is not dominant. Accordingly, even when the input signals are attenuated by the i-th ACC 131-$i$, there is little deterioration in performance. In this case, the i-th ACC 131-$i$ attenuates the input signals, i.e., the pixel signal PSi and the ramp signal RAMP, in response to the switch control signals SW1 and SW2, as shown in FIG. 3B.

As described above, the input signals may be the pixel signal PSi output from a current pixel and the ramp signal RAMP output from the ramp generator 160. When the range of the pixel signal PSi and the range of the ramp signal RAMP go beyond an input range of the amplifier 133-$i$, the amplifier 133-$i$ cannot operate.

The DSP 200 may detect the amount of incident light during automatic exposure based on the image data IDATA of one or more frames and may determine an analog gain according to the detection result. At this time, the DSP 200 may determine whether to attenuate the pixel signal PSi and the ramp signal RAMP when determining the analog gain.

When the ambient light is dark, it is advantageous to use a high analog gain and the pixel signal PSi may be amplified by the amplifier 133-$i$ based on the analog gain. The DSP 200 may determine an analog gain based on the image data IDATA of one or more frames, may compare the level of the pixel signal PSi with the level of a reference signal, and may determine whether to attenuate the pixel signal PSi according to the comparison result. The DSP 200 may also determine whether to attenuate the ramp signal RAMP.

When the analog gain is high (e.g., ×16) and the level of the pixel signal PSi is lower than that of the reference signal, the DSP 200 determines not to attenuate the pixel signal PSi. However, when the analog gain is low (e.g., ×1) and the level of the pixel signal PSi is higher than that of the reference signal, the DSP 200 determines to attenuate the pixel signal PSi.

As described above, when the level of an input signal (e.g., a pixel signal) is higher than that of a reference signal, the SNR of the input signal is relatively high and the noise of the input signal is dominant, and therefore, the noise of the amplifier 133-$i$ does not matter. Accordingly, the CDS block 130 attenuates the input signal and performs CDS on the attenuated input signal. However, when the level of an input signal (e.g., a pixel signal) is equal to or lower than that of a reference signal, the SNR of the input signal is relatively low and noise of the amplifier 133-$i$ is more dominant than the noise of the input signal, and therefore, SNR deterioration may occur. Accordingly, the CDS block 130 performs CDS on the input signal without attenuating the input signal.

Returning to FIG. 2, the switch signal generator 170 may generate the switch control signals SW in response to an attenuation control signal CTRL. The attenuation control signal CTRL is a signal that determines whether to attenuate the pixel signal PSi and the ramp signal RAMP.

The attenuation control signal CTRL may be generated by the DSP 200. In such a situation, the DSP 200 may function as an attenuation control signal generator. In other exemplary embodiments, the attenuation control signal generator may be formed in a digital processing circuit within the image processing device 100. In such a situation, the attenuation control signal generator may be formed inside or outside the buffer 180. For instance, when a power domain including the switch signal generator 170 is different from a power domain including the attenuation control signal generator generating the attenuation control signal CTRL, the attenuation control signal CTRL may have been level-shifted by a level shifter (not shown).

Referring to FIGS. 1 through 3A, the unit CDS circuit 130-$i$ having the first arrangement may include the ACC 131-$i$ and the amplifier 133-$i$. The ACC 131-$i$ may include a first switch circuit 135-1 and a second switch circuit 135-2.

The first switch circuit 135-1 includes the first and second switches S11 and S12 and the first and second capacitors C1 and C2. The second switch circuit 135-2 includes the third and fourth switches S13 and S14 and the third and fourth capacitors C3 and C4. The structure of the first switch circuit 135-1 may be substantially the same as or similar to that of the second switch circuit 135-2, and the first and second switch circuits 135-1 and 135-2 may be symmetrical in structure.

During a reset operation (not shown), the reset switch signal SWR is at a high level, and therefore, the reset switches S21 and S22 are turned on (i.e. the reset switches S21 and S22 are in a closed state). As a result, the amplifier 133-$i$ is reset or initialized. However, as shown in FIG. 3A, during amplification, the reset switch signal SWR is at a low level, the first switch signal SW1 is at a low level, and the second switch signal SW2 is at a high level. Therefore, the reset switches S21 and S22 are turned off (i.e., the reset switches S21 and S22 are in an open state), the first and fourth switches S11 and S14 are turned off (i.e., the first and fourth switches S11 and S14 are in an open state), and the second and third switches S12 and S13 are turned on (i.e., the second and third switches S12 and S13 are in a closed state). Since the second switch S12 is turned on, the first and second capacitors C1 and C2 are connected in parallel to each other. Since the third switch S13 is turned on, the third and fourth capacitors C3 and C4 are connected in parallel to each other. Thus, the signal PSi at a first input terminal INN is not attenuated, and the signal RAMP at the second input terminal INP is not attenuated.

The amplifier 133-$i$ amplifies the difference between the non-attenuated PSi signal input to the first input terminal INN and the non-attenuated RAMP signal input to the second input terminal INP and outputs the amplified signal OUTi.

Referring to FIGS. 1, 2, and 3B, the unit CDS circuit 130-$i$ having the second arrangement may include the ACC 131-$i$ and the amplifier 133-$i$. The ACC 131-$i$ may include the first switch circuit 135-1 and the second switch circuit 135-2.

The first switch circuit 135-1 includes the first and second switches S11 and S12 and the first and second capacitors C1 and C2. The second switch circuit 135-2 includes the third and fourth switches S13 and S14 and the third and fourth capacitors C3 and C4.

During a reset operation (not shown), the reset switch signal SWR is at the high level, and therefore, the reset switches S21 and S22 are turned on (i.e., the reset switches S21 and S22 are in a closed state). As a result, the amplifier 133-$i$ is reset or initialized. However, during amplification as shown in FIG. 3B, the reset switch signal SWR is at the low level, the first switch signal SW1 is at a high level, and the second switch signal SW2 is at a low level. Therefore, the reset switches S21 and S22 are turned off (i.e., the reset switches S21 and S22 are in the open state), the first and fourth switches Si 1 and S14 are turned on (i.e., the first and fourth switches S11 and S14 are in the closed state), and the second and third switches S12 and S13 are turned off (i.e., the second and third switches S12 and S13 are in the open state).

Since the second switch S12 is turned off, the first and second capacitors C1 and C2 are connected in series to each other. Since the third switch S13 is turned off, the third and fourth capacitors C3 and C4 are connected in series to each other. Thus, the signal PSi at the first input terminal INN is attenuated and the signal RAMP at the second input terminal INP is attenuated. The amplifier 133-$i$ amplifies the difference between the attenuated PSi signal input to the first input terminal INN and the attenuated RAMP signal input to the second input terminal INP and outputs the amplified signal OUTi.

Figure 4A:
FIG. 4A is a diagram of waveforms of unattenuated signals.
Figure 4B:
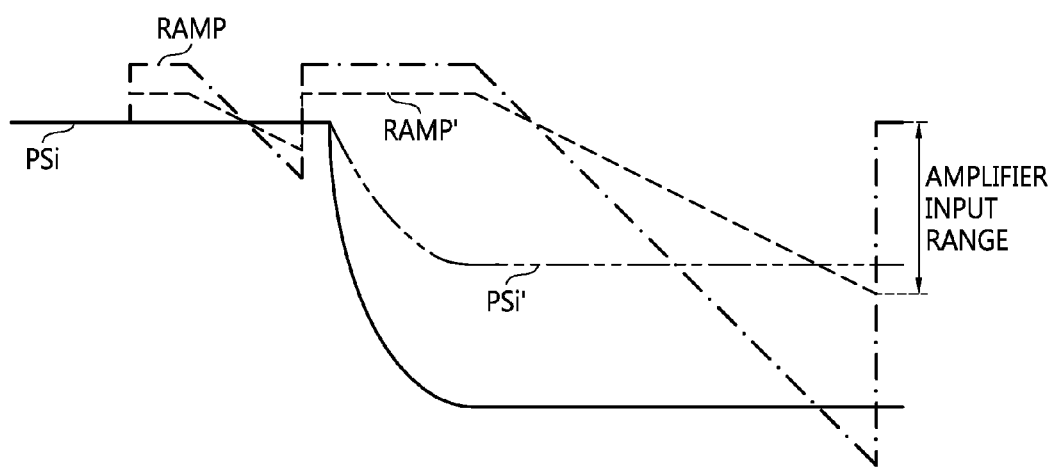
FIG. 4B is a diagram of waveforms of attenuated signals and unattenuated signals.

FIG. 4A is a diagram of the waveforms of unattenuated signals. FIG. 4B is a diagram of the waveforms of attenuated signals and unattenuated signals. FIG. 4A is a graph illustrating the operation of the unit CDS circuit 130-$i$ illustrated in FIG. 3A. Referring to FIGS. 3A and 4A, the pixel signal PSi input to the first input terminal INN of the amplifier 133-$i$ and the ramp signal RAMP input to the second input terminal INP of the amplifier 133-$i$ are within the input range of the amplifier 133-$i$, and therefore, the unit CDS circuit 130-I in the arrangement of FIG. 3A does not attenuate either the pixel signal PSi or the ramp signal RAMP.

Since the level of the pixel signal PSi and the ramp signal RAMP which ramps down are within the input range of the amplifier 133-$i$, the amplifier 133-$i$ may amplify the difference between the pixel signal PSi and the ramp signal RAMP and output the amplified signal OUTi corresponding to the amplification result.

FIG. 4B is a graph illustrating the operation of the unit CDS circuit 130-$i$ illustrated in FIG. 3B. Referring to FIGS. 3B and 4B, the pixel signal PSi input to the first input terminal INN of the amplifier 133-$i$ and the ramp signal RAMP input to the second input terminal INP of the amplifier 133-$i$ are out of the input range of the amplifier 133-$i$, and therefore, the amplifier 133-$i$ cannot operate. Therefore, the pixel signal PSi and the ramp signal RAMP are attenuated.

The pixel signal PSi and the ramp signal RAMP are attenuated by the ACC 131-$i$ to an attenuated pixel signal PSi' and an attenuated ramp signal RAMP' so that the levels of the attenuated pixel signal PSi' and the attenuated ramp signal RAMP' are within the input range of the amplifier 133-$i$. Accordingly, the amplifier 133-$i$ may amplify the difference between the attenuated pixel signal PSi and the attenuated ramp signal RAMP' and output the amplified signal OUTi corresponding to the amplification result.

Figure 5A:
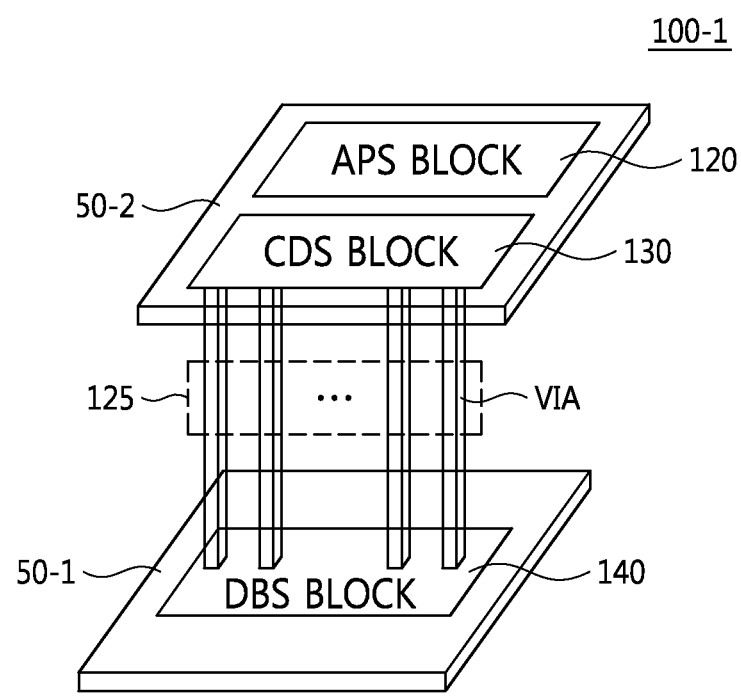
FIG. 5A is a conceptual diagram of the image processing device illustrated in FIG. 1, which has a stack structure according to some exemplary embodiments.
Figure 5B:
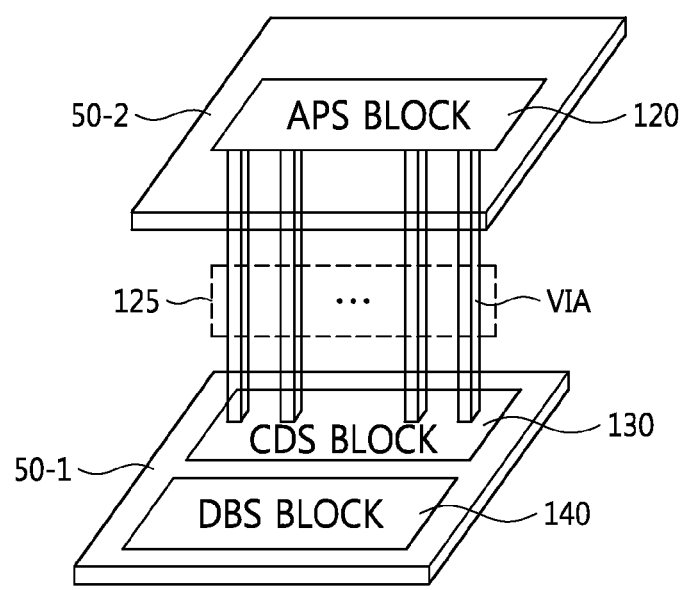
FIG. 5B is a conceptual diagram of the image processing device illustrated in FIG. 1, which has a stack structure according to other exemplary embodiments.

FIG. 5A is a conceptual diagram of the image processing device illustrated in FIG. 1, which has a stack structure according to some exemplary embodiments. FIG. 5B is a conceptual diagram of the image processing device illustrated in FIG. 1, which has a stack structure according to other exemplary embodiments. The image processing devices of FIGS. 5A and 5B may be a CMOS image sensor using backside illumination (BSI).

Referring to FIGS. 1, 2 and 5A, the image processing device 100-1 is an example of the image processing device 100 illustrated in FIG. 1. The image processing device 100-1 may include a first chip 50-1, a second chip 50-2 stacked on the first chip 50-1, and a plurality of vias 125 electrically connecting the first chip 50-1 with the second chip 50-2.

The DBS block 140 may be formed in the first chip 50-1. That is, the timing generator 150, the ramp generator 160, the switch signal generator 170, the buffer 180, and the control register block 190 may be formed in the first chip 50-1.

The APS block 120 and the CDS block 130 may be formed in the second chip 50-2. The vias 125 may transmit signals from the CDS block 130 to the DBS block 140. The vias 125 may be through silicon vias (TSVs).

Referring to FIGS. 1, 2 and 5B, the image processing device 100-2 is another example of the image processing device 100 illustrated in FIG. 1. The image processing device 100-2 may include the first chip 50-1, the second chip 50-2 stacked on the first chip 50-1, and a plurality of the vias 125 electrically connecting the first chip 50-1 with the second chip 50-2.

The CDS block 130 and the DBS block 140 may be formed in the first chip 50-1. The APS block 120 may be formed in the second chip 50-2. The vias 125 may transmit signals from the APS block 120 to the CDS block 130.

Figure 6:
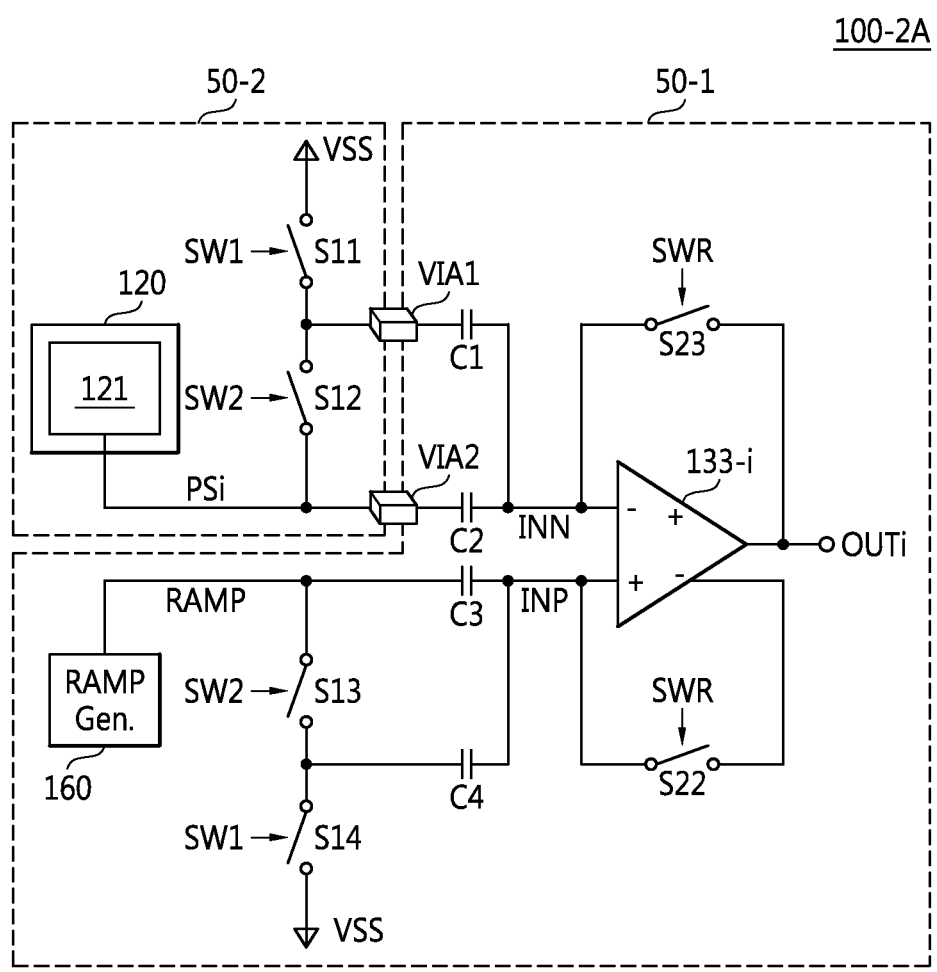
FIG. 6 is a circuit diagram of the image processing device illustrated in FIG. 5B.

FIG. 6 is a circuit diagram 100-2A of the image processing device illustrated in FIG. 5B. Referring to FIGS. 1, 2, 3A, 3B, 5B and 6, the third and fourth switches S13 and S14, the capacitors C1 through C4, and the amplifier 133-$i$ may be formed in the first chip 50-1. The DBS block 140, the timing generator 150, the ramp generator 160, the switch signal generator 170, the buffer 180, and the control register block 190 may be formed in the first chip 50-1 in some exemplary embodiments.

The APS block 120 and the first and second switches S11 and S12 may be formed in the second chip 50-2. In such a case, a first via VIA1 electrically connects the first switch S11 with the first capacitor C1 and a second via VIA1 electrically connects the second switch S12 with the second capacitor C2.

For instance, a voltage (e.g., 1.8 V) applied to the amplifier 133-$i$ formed in the first chip 50-1 may be lower than a voltage (e.g., 2.8 V) applied to the APS block 120 formed in the second chip 50-2. In this case, when an output signal of the second chip 50-2 has a wider range than an input signal of the first chip 50-1 and a voltage exceeding an operating voltage of a circuit (e.g., the CDS block 130) formed in the second chip 50-2 is generated in the first chip 50-1, the voltage is attenuated using the switches Si 1 and S12. The first and second arrangements are determined by the switch control signals SW1 and SW2, as described above with reference to FIGS. 3A and 3B.

Figure 7:
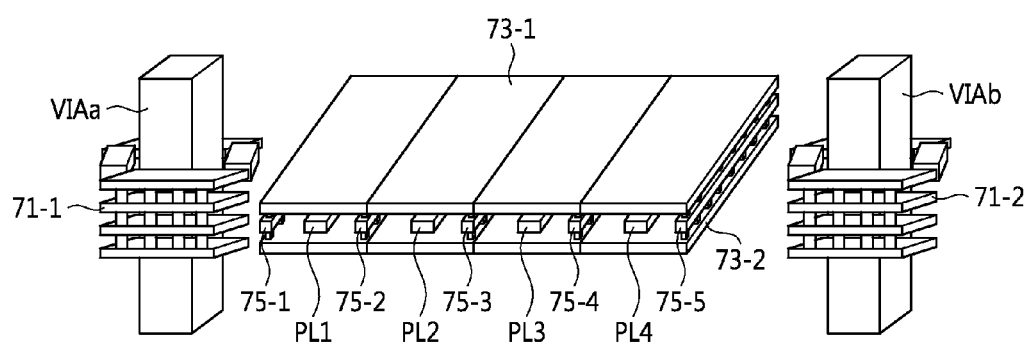
FIG. 7 is a conceptual diagram of an arrangement of a plurality of shielding metals for shielding a plurality of vias and signal transmission lines in an image processing device having a stack structure.

FIG. 7 is a conceptual diagram of the arrangement of a plurality of shielding metals for shielding a plurality of vias and signal transmission lines in an image processing device having a stack structure. Referring to FIGS. 1, 6, and 7, the image processing devices 100, 100-1, and 100-2 may include a plurality of shielding metals to prevent coupling between analog signals. Signal transmission lines PL1 through PL4 transmit pixel signals output from the APS block 120.

Coupling may occur between the signal transmission lines PL1 through PL4. Coupling may also occur between vias VIAa and VIAb when analog signals are transmitted through the vias VIAa and VIAb. Coupling may also occur between the signal transmission lines PL1 through PL4 and the vias VIAa and VIAb.

To prevent the coupling occurring between signals, the image processing devices 100, 100-1, and 100-2 may include shielding metals 73-1, 73-2, 75-1, 75-2, 75-3, 75-4, and 75-5 to shield the signal transmission lines PL1 through PL4. The image processing devices 100, 100-1, and 100-2 may also include shielding metals 71-1 and 71-2 to shield the vias VIAa and VIAb.

Figure 8:
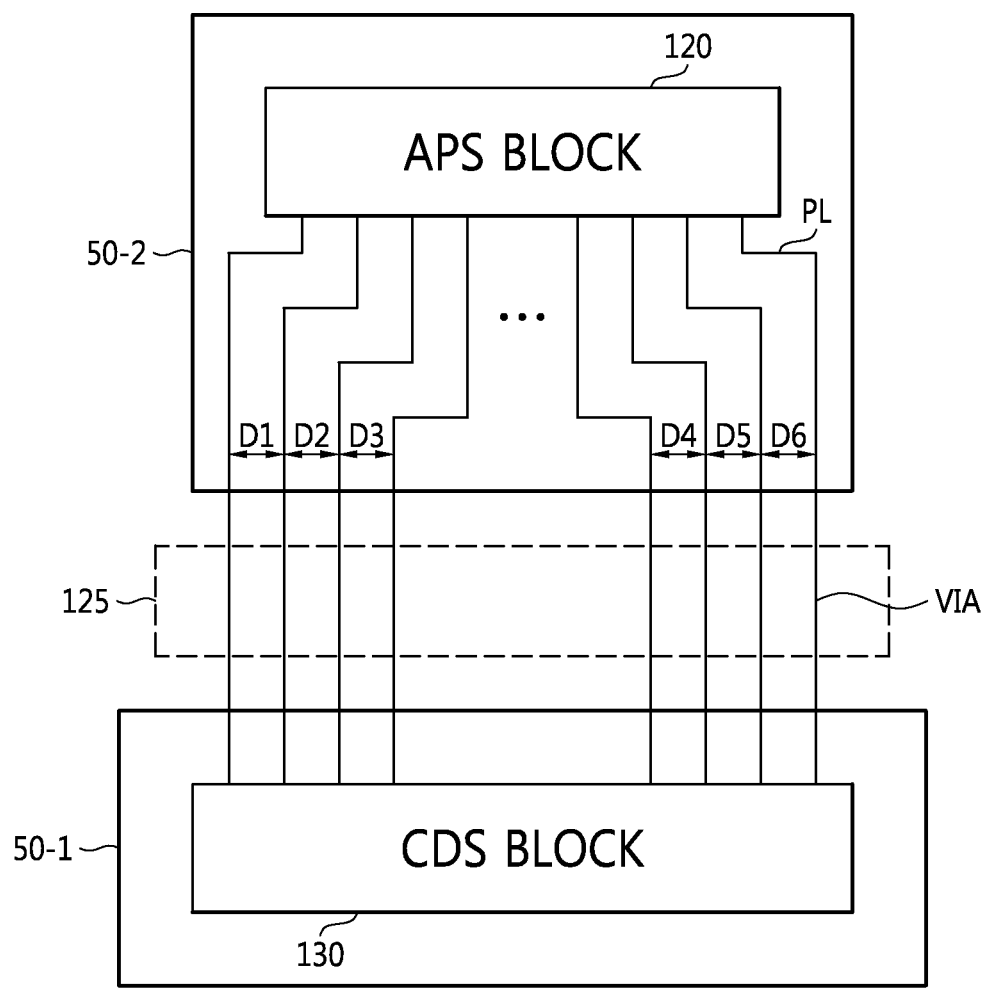
FIG. 8 is a diagram of a layout of signal transmission lines in an image processing device having a stack structure according to some exemplary embodiments.

When the signal transmission lines PL1 through PL4 and the vias VIAa and VIAb are shield using the shielding metals 73-1, 73-2, 75-1, 75-2, 75-3, 75-4, 75-5, 71-1, and 71-2, which are grounded, coupling between signals is minimized. In other exemplary embodiments, shielding metals may be used for diverse signal lines that may cause interference between signals. FIG. 8 is a diagram of a layout of signal transmission lines in an image processing device having a stack structure according to some exemplary embodiments. Referring to FIGS. 5B and 8, the second chip 50-2 of the image processing device 100, 100-1, or 100-2 may include the APS block 120 and signal transmission lines PL. The signal transmission lines PL are connected between the APS block 120 and the respective vias 125.

When, as shown in FIG. 8, the width of the second chip 50-2 is less than or greater than the width of the CDS block 130 in the first chip 50-1, the signal transmission lines PL may be arranged to have the same distances D1 through D6 (i.e., D1=D2=D3=D4=D5=D6) so that all routing paths of pixel outputs connected to the first chip 50-1 and inputs of the CDS block 130 connected to the second chip 50-2 are the same. Additionally, in some exemplary embodiments, the APS block 120 and the CDS block 130 may have different pitches of their respective signal transmission lines (see FIG. 9). In such a case, the signal transmission lines may be routed out so as to increase or decrease the distance between signal transmission lines in the first chip 50-1 or the second chip 50-2. For example, the signal transmission lines of the APS block 120 may be closer together than the signal transmission lines of the CDS block 130. In such a case, the signal transmission lines PL may be routed out from the APS block 120 to change the pitch such that the signal transmission lines PL in an area in which the signal transmission lines PL are connected to the first chip 50-1 have the same distances D1 through D6 (i.e., D1=D2=D3=D4=D5=D6).

Figure 9:
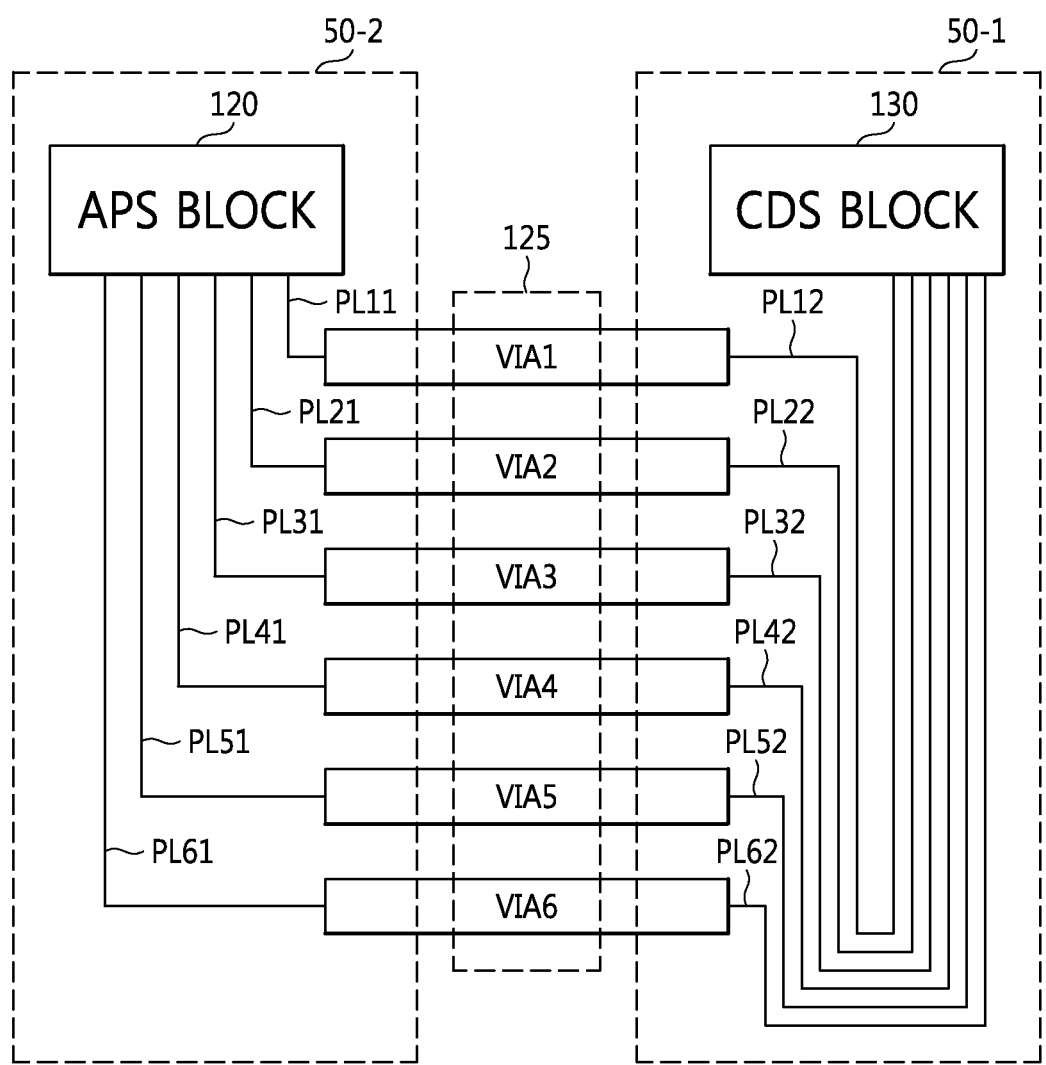
FIG. 9 is a diagram of a layout of signal transmission lines in an image processing device having a stack structure according to other exemplary embodiments.

FIG. 9 is a diagram of a layout of signal transmission lines in an image processing device having a stack structure according to other exemplary embodiments. Referring to FIGS. 5B and 9, when a plurality of the vias 125 are arranged, since the area of each via 125 is greater than a pixel pitch, RC delay may occur due to a difference in routing path between signal transmission lines for respective pixel signals and shading or column fixed pattern noise (CFPN) may thus occur.

To prevent such RC delay caused by differences among the paths of signal transmission lines PL11, PL21, PL31, PL41, PL51, and PL61 in the second chip 50-2, the paths of signal transmission lines PL12, PL22, PL32, PL42, PL52, and PL62 in the first chip 50-1 may be different from one another. In detail, when there is a length of each of vias VIA1 through VIAE, routing may be formed so that the sum of the lengths of a pair of signal transmission lines PL11 and PL12, PL21 and PL22, PL31 and PL32, PL41 and PL42, PL51 and PL52, or PL61 and PL62 is the same as that of any of other pairs PL11 and PL12, PL21 and PL22, PL31 and PL32, PL41 and PL42, PL51 and PL52, and PL61 and PL62.

In other words, routing may be formed so that the sum of the lengths of the signal transmission lines PL11 and PL12 is the same as the sum of the lengths of the signal transmission lines PL61 and PL62, the sum of the lengths of the signal transmission lines PL21 and PL22 is the same as the sum of the lengths of the signal transmission lines PL51 and PL52, the sum of the lengths of the signal transmission lines PL31 and PL32 is the same as the sum of the lengths of the signal transmission lines PL41 and PL42, and PL11+PL12=PL21+PL22=PL31+PL32=PL41+PL42=PL51+PL52=PL61+PL62.

Figure 10:
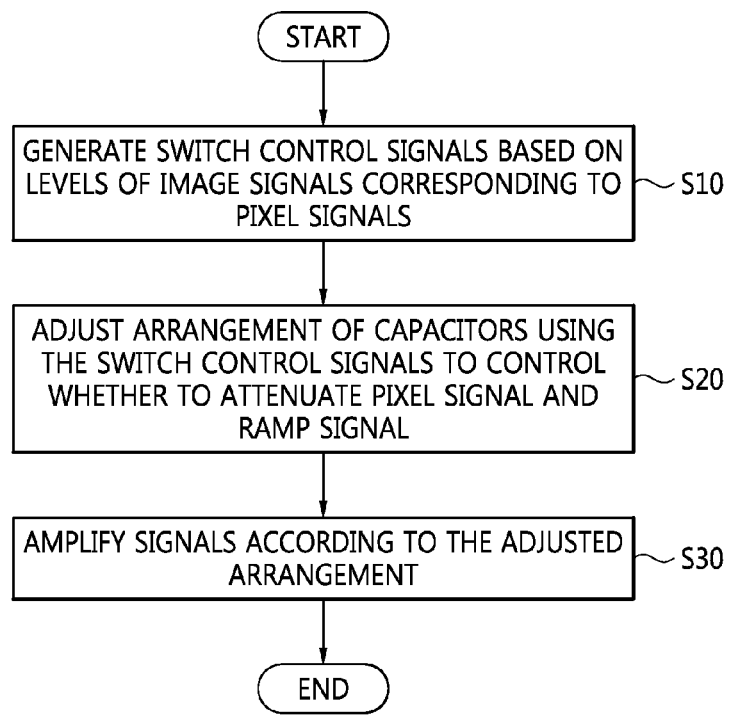
FIG. 10 is a flowchart of a method of operating the image processing device illustrated in FIG. 1 according to some exemplary embodiments.

FIG. 10 is a flowchart of a method of operating the image processing device illustrated in FIG. 1 according to some exemplary embodiments. Referring to FIGS. 1 through 10, the image processing device 100, 100-1, or 100-2 may generate the switch control signals SW based on the levels of image signals corresponding to pixel signals output from pixels in operation S10. The image signals may be output signals of the DBS block 140, the buffer 180, or the ISP 210. The image signals may be related with one or more frames.

The image processing device 100, 100-1, or 100-2 may control the switches S11 through S14 to be in an "on" state or an "off" state using the switch control signals SW in order to adjust the arrangement of the capacitors C1 through C4 to control whether to attenuate the pixel signal PSi and the ramp signal RAMP in operation S20.

The image processing device 100, 100-1, or 100-2 may amplify the signals according to the adjusted arrangement in operation S30. The image processing device 100, 100-1, or 100-2 may transmit signals to the first input terminal INN and the second input terminal INP of the amplifier 133-$i$ using a first arrangement (as shown in FIG. 3A) or a second arrangement (as shown in FIG. 3B) resulting from the arrangement adjustment. As described above, the amplifier 133-$i$ may be formed in the first chip 50-1 and the APS block 120 may be formed on the second chip 50-2 stacked on the first chip 50-1.

Figure 11:
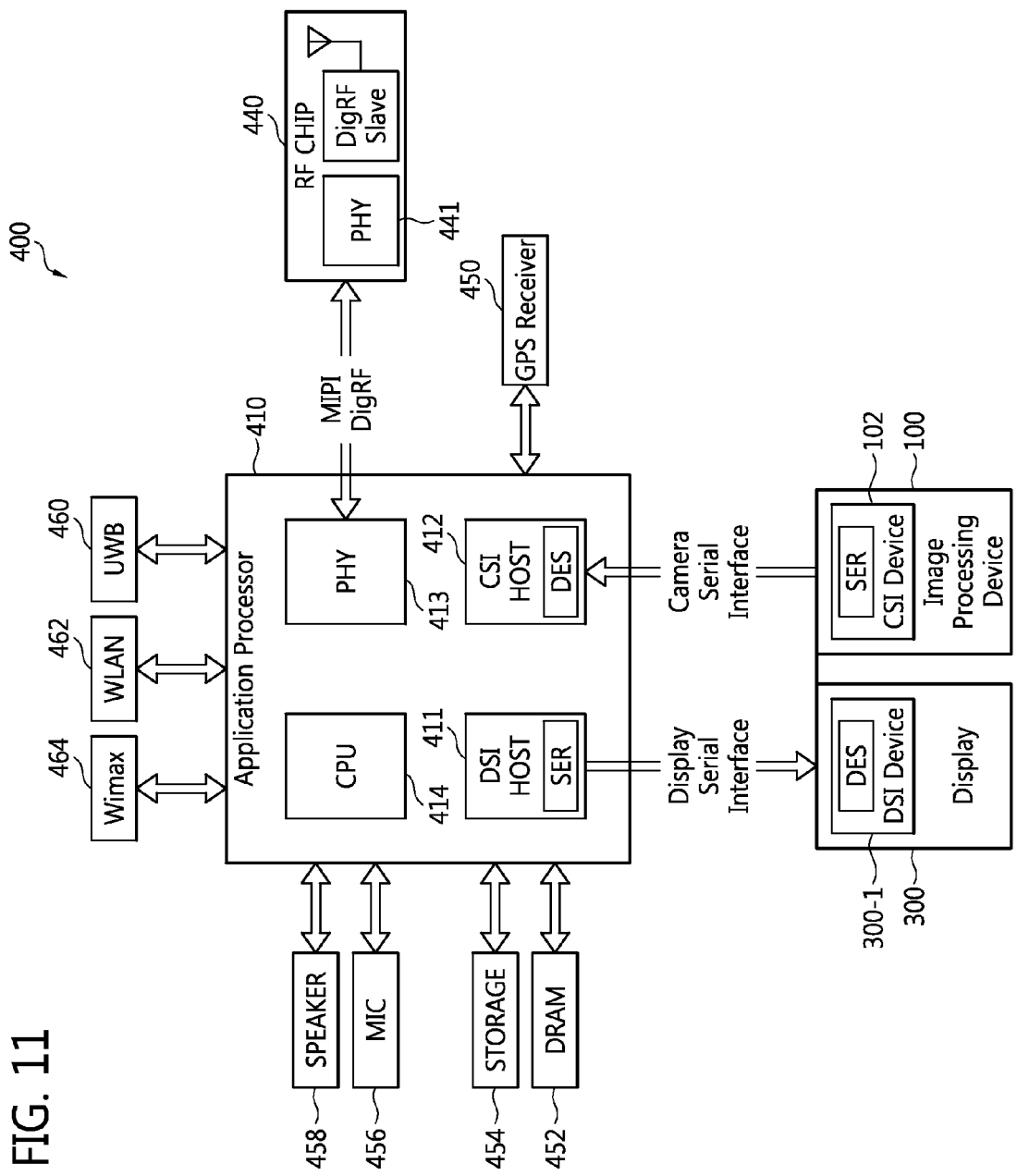
FIG. 11 is a block diagram of an image processing system according to other exemplary embodiments.

FIG. 11 is a block diagram of an image processing system according to other exemplary embodiments. Referring to FIGS. 1 through 11, an image processing system 400 may be implemented to be able to use or support mobile industry processor interface (MIPI). The image processing system 400 may be a laptop computer, a cellular phone, a smart phone, a tablet PC, a PDA, an EDA, a digital still camera, a digital video camera, a PMP, a MID, a wearable computer, an IoT device, or an IoE device, etc. The image processing system 400 includes an application processor (AP) 410, the image processing device 100, and the display 300.

A camera serial interface (CSI) host 412 in the AP 410 may perform serial communication with a CSI device 102 in the image processing device 100 through CSI. A deserializer DES and a serializer SER may be included in the CSI host 412 and the CSI device 102, respectively. The image processing device 100 illustrated in FIG. 11 is the one that has been described with reference to FIGS. 1 through 10.

A display serial interface (DSI) host 411 in the AP 410 may perform serial communication with a DSI device 300-1 in the display 300 through DSI. A serializer SER and a deserializer DES may be included in the DSI host 411 and the DSI device 300-1, respectively. The image data IDATA (in FIG. 1) output from the image processing device 100 may be transmitted to the AP 410 through CSI. The AP 410 may process the image data IDATA and may transmit processed image data to the display 300 through DSI.

The image processing system 400 may also include a radio frequency (RF) chip 440 communicating with the AP 410. A physical layer (PHY) 413 in the AP 410 and a PHY 441 in the RF chip 440 may communicate data with each other according to MIPI DigRF.

A central processing unit (CPU) 414 in the AP 410 may control the operations of the DSI host 411, the CSI host 412, and the PHY 413. The CPU 414 may include at least one core. The AP 410 may be implemented in an integrated circuit (IC) or a system on chip (SoC). The AP 410 may be a processor or a host that can control the operations of the image processing device 100.

The image processing system 400 may further include a global positioning system (GPS) receiver 450, a volatile memory 452 such as dynamic random access memory (DRAM), a data storage 454 formed using non-volatile memory such as flash-based memory, a microphone (MIC) 456, and/or a speaker 458. The data storage 454 may be implemented as an external memory removable from the AP 410. The data storage 454 may also be implemented as a universal flash storage (UFS), a multimedia card (MMC), an embedded MMC (eMMC), a universal serial bus (USB) flash drive, or a memory card, etc. The image processing system 400 may communicate with external devices using at least one communication protocol or standard, e.g., ultra-wideband (UWB) 460, wireless local area network (WLAN) 462, worldwide interoperability for microwave access (Wi-max) 464, or long term evolution (LTETM) (not shown), or the like. In other exemplary embodiments, the image processing system 400 may also include at least one module among a near field communication (NFC) module, a WiFi module, or a Bluetooth module.

Figure 12:
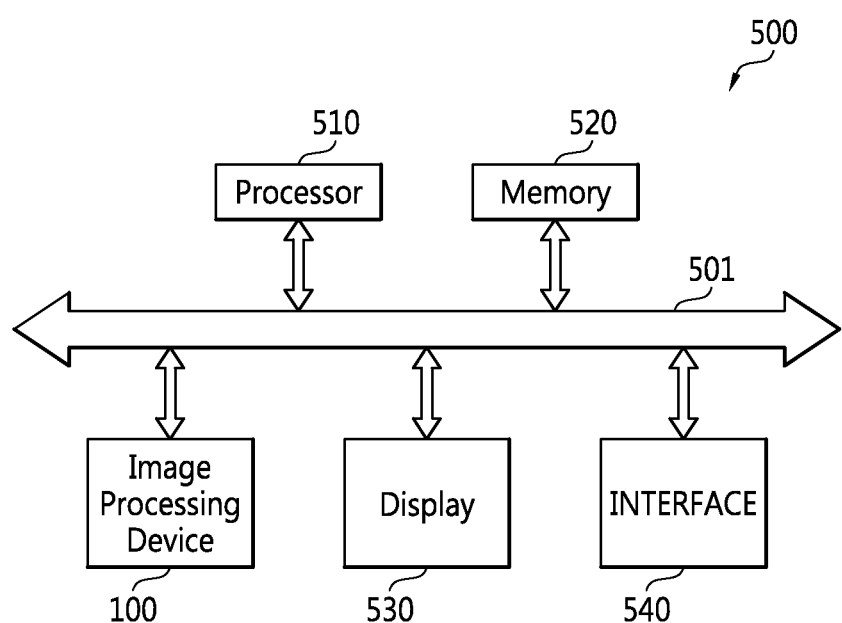
FIG. 12 is a block diagram of an image processing system according to further exemplary embodiments.

FIG. 12 is a block diagram of an image processing system according to further exemplary embodiments. Referring to FIGS. 1 through 10 and FIG. 12, an image processing system 500 may include the image processing device 100, a processor 510, a memory 520, a display 530, and an interface 540.

The processor 510 may control the operation of the image processing device 100. The processor 510 may be one or more microprocessors. The processor 510 may process pixel signals output from the image processing device 100 to generate image data. The memory 520 may store a program for controlling the operation of the image processing device 100 and may store image data generated by the processor 510. The processor 510 may execute the program stored in the memory 520. The memory 520 may be formed as volatile or non-volatile memory.

The display 530 may display the image data output from the processor 510 or the memory 520. The interface 540 may be formed for the input and output of image data. The interface 540 may be implemented as a wire or wireless interface.

As described above, according to some exemplary embodiments, an image processing device selectively controls attenuation or non-attenuation of an input signal according to the size of the input signal, thereby performing analog-to-digital conversion of the input signal in a wide range without performance deterioration. In addition, the image processing device performs the analog-to-digital conversion in a stack structure, so that optimum processes are performed on each chip and an amplifier uses low power supply voltage, decreasing power consumption.

While the inventive concept has been particularly shown and described with reference to certain exemplary embodiments thereof, it will be understood by those of ordinary skill in the art that various changes in forms and details may be made therein without departing from the spirit and scope of the inventive concept as defined by the following claims.

What is claimed is:

1. An image processing device comprising:
a switch signal generator configured to generate a plurality of switch control signals based on a level of an image signal that corresponds to a pixel signal output from a pixel;
an amplifier comprising a first input terminal and a second input terminal;
a ramp generator configured to generate a ramp signal; and
an attenuation control circuit configured to switch between a first circuit configuration in which the ramp signal and the pixel signal are not attenuated, and a second circuit configuration in which the ramp signal and the pixel signal are attenuated according to the switch control signals, and to transmit signals generated as a result of the switched configuration to the first input terminal and the second input terminal.

2. The image processing device of claim 1, wherein the pixel and the amplifier are formed in one chip.

3. The image processing device of claim 1, wherein the pixel and the amplifier are formed in different chips, respectively.

4. The image processing device of claim 1, wherein the attenuation control circuit comprises:
a first switch circuit configured to be connected between the pixel and the first input terminal and comprising a plurality of first capacitors among the plurality of capacitors, and a plurality of first switches; and
a second switch circuit configured to be connected between the ramp signal generator and the second input terminal and comprising a plurality of second capacitors among the plurality of capacitors, and a plurality of second switches, wherein the first switch circuit controls a configuration of the first capacitors using the first switches which operate in response to the switch signals, and the second switch circuit controls a configuration of the second capacitors using the second switches which operate in response to the switch signals.

5. The image processing device of claim 1, wherein the image processing device is a semiconductor package.

6. The image processing device of claim 1, wherein a first voltage applied to the pixel is higher than a second voltage applied to the amplifier.

7. The image processing device of claim 4, wherein the first switch circuit has a structure symmetrical to a structure of the second switch circuit.

8. The image processing device of claim 4, further comprising a plurality of vias, wherein the amplifier and the first capacitors are formed in a first chip and the pixel and the first switches are formed in a second chip stacked on the first chip, and the vias respectively connect each of the first switches with each of the first capacitors.

9. The image processing device of claim 4, further comprising a plurality of vias, wherein the amplifier is formed in a first chip and the pixel and the first switches are formed in a second chip stacked on the first chip, and the vias connect the first switches with the amplifier.

10. The image processing device of claim 8, further comprising a plurality of shielding metals configured to shield the vias, and to shield a plurality of signal transmission lines that carry the pixel signal.

11. The image processing device of claim 8, wherein the second chip comprises signal transmission lines connected between first pixels including the pixel and the vias, and the signal transmission lines are spaced a predetermined distance apart from each other.

12. The image processing device of claim 8, wherein the first chip comprises a first signal transmission line and a second signal transmission line, and the second chip comprises a third signal transmission line and a fourth signal transmission line, and a sum of a length of the first signal transmission line and a length of the third signal transmission line is the same as a sum of a length of the second signal transmission line and a length of the fourth signal transmission line.

13. An image processing system comprising:
an image processing device; and
a processor configured to control an operation of the image processing device,
wherein the image processing device comprises:
a switch signal generator configured to generate a plurality of switch control signals based on a level of an image signal related with a pixel signal output from a pixel;
an amplifier comprising a first input terminal and a second input terminal;
a ramp generator configured to generate a ramp signal; and
an attenuation control circuit configured to switch between a first circuit configuration in which the ramp signal and the pixel signal are not attenuated, and a second circuit configuration in which the ramp signal and the pixel signal are attenuated according to the switch control signals, and to transmit signals generated as a result of the switched configuration to the first input terminal and the second input terminal.

14. The image processing system of claim 13, further comprising a camera serial interface connected between the image processing device and the processor.

15. The image processing system of claim 13, wherein the attenuation control circuit comprises:
a first switch circuit configured to be connected between the pixel and the first input terminal, and comprising a plurality of first capacitors among the plurality of capacitors and a plurality of first switches; and
a second switch circuit configured to be connected between the ramp signal generator and the second input terminal, and comprising a plurality of second capacitors among the plurality of capacitors and a plurality of second switches,
wherein the first switch circuit controls a configuration of the first capacitors using the first switches which operate in response to the switch signals, and
the second switch circuit controls a configuration of the second capacitors using the second switches which operate in response to the switch signals.

16. The image processing device of claim 1, wherein the image signal is a digital signal corresponding to an analog pixel signal output from a pixel.

17. An image processing device comprising:
a ramp generator configured to generate a ramp signal;
a switch signal generator configured to generate a plurality of switch control signals based on a level of a pixel signal output from a pixel; and
an attenuation control circuit configured to switch between a first circuit configuration in which the ramp signal and the pixel signal are not attenuated, and a second circuit configuration in which the ramp signal and the pixel signal are attenuated, according to the switch control signals, and to transmit signals generated as a result of the switched circuit configuration to a first input terminal and a second input terminal.

18. The image processing device of claim 17, wherein the attenuation control circuit comprises a plurality of first capacitors and a plurality of first switches electrically connected between the pixel and the first input terminal, and a plurality of second capacitors and a plurality of second switches electrically connected between the ramp generator and the second input terminal,
wherein in the first circuit configuration, the first switches are controlled to electrically connect the first capacitors together in parallel between the pixel and the first input terminal, and the second switches are controlled to electrically connect the second capactiors together in parallel between the ramp generator and the second input terminal, and
wherein in the second circuit configuration, the first switches are controlled to electrically connect the first capacitors together in series between the pixel and the first input terminal, and the second switches are controlled to electrically connect the second capactiors together in series between the ramp generator and the second input terminal.

19. The image processing device of claim 18, wherein the first switches are disposed on a first chip, and the second switches, the first capacitors and the second capacitor are disposed on a second chip different from the first chip.

20. The image processing device of claim 19, further comprising a plurality of vias that electrically connect the first switches to the first capacitors, respectively.

* * * * *